United States Patent
Dahlby et al.

(10) Patent No.: US 7,027,415 B1
(45) Date of Patent: Apr. 11, 2006

(54) DYNAMIC ALLOCATION AND DE-ALLOCATION OF MULTIPLE COMMUNICATION CHANNELS FOR BANDWIDTH ON-DEMAND

(75) Inventors: Douglas C. Dahlby, Fremont, CA (US); Stephen D. Fleischer, Mountain View, CA (US); Mitchell D. Trott, Mountain View, CA (US); Christopher R. Uhlik, Danville, CA (US)

(73) Assignee: ArrayComm, Inc., San Jose, CA (US)

( * ) Notice: Subject to any disclaimer, the term of this patent is extended or adjusted under 35 U.S.C. 154(b) by 1009 days.

(21) Appl. No.: 09/813,200

(22) Filed: Mar. 20, 2001

(51) Int. Cl.
*H04B 7/212* (2006.01)

(52) U.S. Cl. ...................................... 370/322; 370/348
(58) Field of Classification Search ................ 370/230, 370/248, 252, 254, 261, 310, 328, 329, 338, 370/341, 395.2, 431, 469, 412, 321, 322, 370/326, 330, 337, 347–348
See application file for complete search history.

(56) References Cited

U.S. PATENT DOCUMENTS 5,818,829 A * 10/1998 Raith et al. ................. 370/347
6,081,536 A * 6/2000 Gorsuch et al. ............. 370/468
6,236,656 B1 * 5/2001 Westerberg et al. ........ 370/395.4
2002/0082033 A1 * 6/2002 Lohtia et al. ............... 455/517

* cited by examiner

*Primary Examiner*—David Vincent
(74) *Attorney, Agent, or Firm*—Blakely, Sokoloff Taylor & Zafman LLP

(57) ABSTRACT

A method and apparatus are provided that dynamically allocates communication streams to provide flexible bandwidth to terminals of a communications system. In one embodiment the invention includes identifying a first terminal and a second terminal to each other for the communication of traffic over at least one of multiple streams; and dynamically allocating and de-allocating further streams based on the traffic to be carried and the traffic capacity of opened streams between the first and the second terminals. The invention may further include comparing traffic to be carried between the first terminal and the second terminal to the capacity of any open streams between the first terminal and the second terminal and allocating or de-allocating at least one stream based on the comparison. Alternatively, the invention may include comparing depths of transmit queues to the capacity of any open streams between the first terminal and the second terminal and allocating or de-allocating at least one stream based on the comparison.

28 Claims, 8 Drawing Sheets

DYNAMIC ALLOCATION AND DE-ALLOCATION OF MULTIPLE COMMUNICATION CHANNELS FOR BANDWIDTH ON-DEMAND

BACKGROUND OF THE INVENTION

1. Field of the Invention

The invention relates generally to the field of digital signal communications and channel allocation. More particularly, the invention relates to dynamically aggregating communications streams between two communicating terminals to accommodate variations in bandwidth requirements.

2. Description of the Related Art

In data communications systems that share communications channels, a procedure must be implemented to allow different users to take turns using the channels. However, different users may require differing amounts of data throughput at different times. For users that produce varying traffic patterns in the information network, it is desired to provide the required amount of bandwidth on-demand. Given that multiple users in the network may be contending for limited resources and may have different bandwidth needs, an optimal system will maximize throughput and minimize latency for individual users, while maximizing the efficiency of utilizing total system bandwidth and other network resources.

In many systems, users are allocated a channel for a limited period of time. Then the channel is de-allocated and allocated to another user. This is known as a circuit-switched system. In circuit-switched systems extensive setup must be done so that subsequent packets do not need to carry the full routing information. The packets instead will always travel the same circuit until that circuit is switched. Many circuit-switched systems provide a dedicated line or virtual line to every user. The bandwidth of this line varies depending on the desired value selected when a connection is established, but it remains constant for the duration of the connection. As a result, much of the dedicated bandwidth is unused for users with varying data traffic patterns.

In other systems, channels are never allocated but are always shared. This kind of system requires no overhead signaling for channel allocation and de-allocation but must have some way of directing packets and of resolving conflicts. Such systems are typically called packet-switched because each packet contains the full routing information required to direct the packet to its intended destination. Packet switching requires no overhead in the setup but adds significant overhead to each packet. For example, TCP/IP network users share the same high-bandwidth channel (i.e. wire), and each user takes more or less of the available shared bandwidth, depending on its needs and the bandwidth use of other users on the network. This enables dynamic, efficient bandwidth allocation both among users and for a single user as the data traffic pattern varies. However, this packet-based approach requires complete switching and addressing information with every packet, reducing bandwidth efficiency.

BRIEF SUMMARY OF THE INVENTION

A method and apparatus are provided that dynamically allocates communication streams to provide flexible bandwidth to terminals of a communications system. In one embodiment the invention includes identifying a first terminal and a second terminal to each other for the communication of traffic over at least one of multiple streams; and dynamically allocating and de-allocating further streams based on the traffic to be carried and the traffic capacity of opened streams between the first and the second terminals. The invention may further include comparing traffic to be carried between the first terminal and the second terminal to the capacity of any open streams between the first terminal and the second terminal and allocating or de-allocating at least one stream based on the comparison. Alternatively, the invention may include comparing depths of transmit queues to the capacity of any open streams between the first terminal and the second terminal and allocating or de-allocating at least one stream based on the comparison.

In another embodiment, the invention includes comparing traffic to be carried between a first terminal and a second terminal to the capacity of the multiple streams, allocating at least one stream based on the comparison for communications between the first terminal and the second terminal based on the comparison, further comparing traffic to be carried between the first terminal and the second terminal after allocating the at least one stream, and allocating or de-allocating at least one stream based on the further comparison In another embodiment, the invention includes opening a first wireless communications stream between a first terminal and a second terminal for the communication of traffic, transmitting a transmit queue depth report from the first terminal to the second terminal, receiving an assignment of a further stream for communications between the first and the second terminal based on the queue depth report, transmitting further queue depth reports from the first terminal to the second terminal, and receiving stream allocations and de-allocations based on the further queue depth reports.

Other features of the present invention will be apparent from the accompanying drawings from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

Figure 1A:
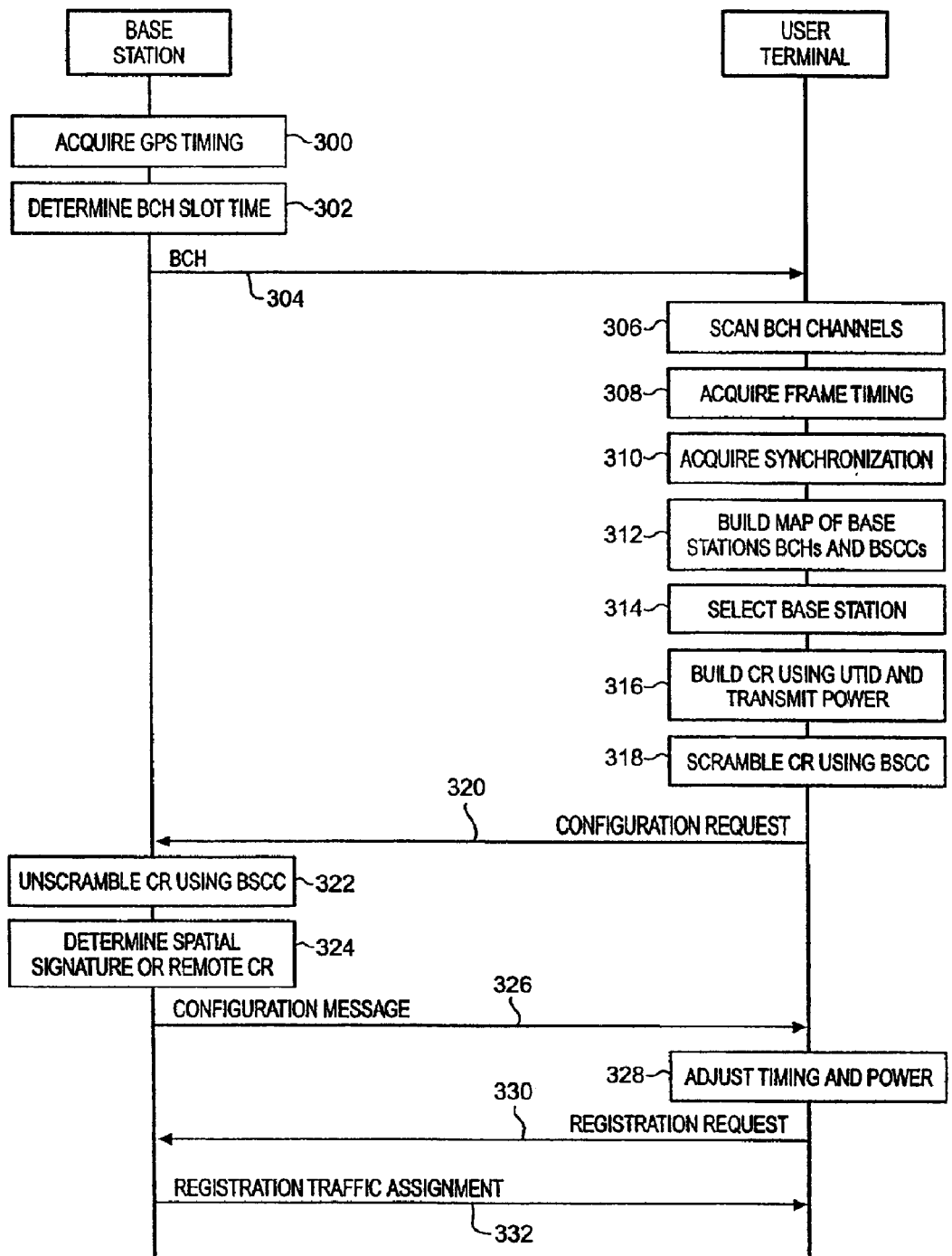
FIGS. 1A and 1B are a diagram showing an exchange of messages between two terminals in accordance with the present invention.

The present invention allows for the communication of data, which may represent numerical, textual, graphical, pictorial, audio, video, voice or any other type of information between terminals in a communications system.

Generally, the terminals will be referred to herein as user terminals and base stations and communications will be between a user terminal and a base station. However, the terminals can be in any of a variety of other configurations and communications can be between peers, such as two user terminals or two base stations and communications can be broadcast or multicast as is desired for the particular system under consideration.

The data is transmitted as packets in duplexed circuit-switched channels called streams. Each new channel constitutes a new stream. The stream, in one embodiment, is a slot assignment of a frequency-hopping time division duplex TDMA (time division multiple access) radio communications system, although other types of channels are also appropriate for application of the present invention depending upon the circumstances. In this embodiment, the stream is made up of an uplink slot to send data to the base station and a downlink slot to receive data from the base station. The slots are a portion of a repeating 5 msec frame on a channel that hops frequency every frame.

Sophisticated user terminals that can communicate simultaneously on several time slots can open multiple streams. Once one stream is open, the user terminal may receive in-band channel aggregation commands telling it to send a random access channel request message RA-rts or RA-rreq to a particular additional hardware resource (time-sot and frequency hopping sequence). When this results in opening an additional stream, multiple data packets can flow in parallel on the multiple streams increasing throughput. In one embodiment, channel aggregation can be done over carriers as well as time slots. High end user terminals may be able to aggregate over as many as 4 or more carriers to achieve data rates on the order of 4 Mbps.

By aggregating streams, the present invention can provide bandwidth on-demand for every user in the system. To accomplish this, a set of fixed-bandwidth communication channels or streams, are dynamically allocated and de-allocated among all users in the system. Because this allocation is dynamic, the system can compensate for varying traffic patterns from a given user. Additional streams are allocated to a user when its traffic increases, and streams are de-allocated when its traffic decreases. This dynamic allocation overcomes the drawback of wasted system bandwidth by sharing these stream resources among all users, and only providing each user with the streams needed to support its bandwidth requirements at the current time. Since this approach is a hybrid between packet-switched and circuit-switched approaches, it minimizes overhead. The overhead for dynamically allocating streams has been designed to be small, and once a stream is opened by a given user, data packets can be sent continuously with zero overhead. Of course, the streams can need not have a fixed bandwidth. They can have different amounts of bandwidth and may vary over time. In one embodiment, streams consume equal amounts of radio spectrum but have different bit rates depending on channel conditions.

While the invention will be described in the context of users, as will be described below, streams are assigned on the basis of a registration not a user. A registration opens a session and the stream is a part of the session. Each session can have multiple streams. However, a user can also have multiple sessions or registrations. This allows a user to further increase the bandwidth which is allocated to it. Different sessions can be with different base stations or different modems or all on the same hardware resource. Accordingly, any reference to a user opening a stream should be understood as relating to a stream that is opened within a session and that any one user may have more than one session and corresponding registration at the same time.

The present invention divides the available system bandwidth into multiple communication resources (i.e. streams) and dynamically aggregates these channels based on a dynamic criterion using a channel allocation algorithm and a data distribution algorithm. The channel allocation algorithm incorporates a dynamic criterion for deciding when to add and when to remove channels for a particular user. The procedure for allocating and mapping a channel to a particular user is designed to minimize overhead. The data distribution algorithm handles both incoming and outgoing data. For data sent by a particular user to the network, this algorithm splits the data onto the set of channels currently allocated to that user. For data received from the network, it reassembles a particular user's data from the user's channel set and sends it to the user.

The present invention is described in the context of a wireless radio network, however, it can also be applied to infrared, ultrasonic, optical and wired networks. In particular, the communication resources are full-duplex channels implemented as RF signals over the air. The complete set of these channels spans the spectrum allocated to this wireless network. Due to inherent asymmetries between the uplink direction (remote terminal to base station) and the downlink direction (base station to remoter terminal) of this wireless network, separate channel allocation algorithms are implemented for each direction. The streams can be used either for one-way or two-way communications. Similarly, the algorithms can be implemented independently for either direction of communication, regardless of whether the streams are one-way or two-way. Similarly, each stream need not have the same data rate or bandwidth. In one embodiment, different streams can have different modulation and transmission schemes, supporting different bit rates and different bit error rates.

Streams

In one embodiment, a stream is opened when a user terminal transmits a request to the base station that will be called RA-rts (Random Access-request to send). The RA-rts is sent on a previously designated channel for RA (Random Access) messages. In one embodiment the RA channel is a set of channels, which may be the same set of channels used to exchange traffic bursts. The base station, upon receiving the message, determines whether a stream can be opened for the requesting user terminal and, if so, sends an AA-cts (Access Acknowledgment-clear to send) message back to the user terminal that identifies the channel for the stream, both the uplink portion on which the user will send and the downlink portion on which the user terminal will receive. This exchange opens the stream and allows data to be exchanged. In one embodiment, in-band signaling is provided so that further signaling, requests and control messages can also be sent in the stream thereby freeing capacity in the random access channels. Because of a prior registration process to be described in more detail below, no further messages are necessary in order to open a stream. As a result, the stream can be opened within the course of one uplink random access timeslot and the following downlink timeslot within the same frame. Assigning streams quickly allows streams to be closed more frequently without significantly affecting communications speed between the user terminal and the base station and without causing the channel to be used for stream assignment when it could be used for stream data traffic. This allows the total capacity of shared system resources to be increased.

The user terminal will typically open a stream when it has data in a buffer to be sent to the base station. As mentioned above, the data may be of any kind including a request for data from or via the base station. If, for example, the user terminal is being used as a web browser, the data can be simply an HTML (Hyper-Text Markup Language) request to retrieve a web page with a particular URL (Uniform Resource Locator). Such a message when received by the base station might be transmitted to an ISP (Internet Service Provider) to retrieve the page or the base station may be an ISP.

The user terminal may also request that a stream be opened in response to a request from a base station. In one embodiment, the base station can send an RA-rts to the user terminal, which can then respond with AA-rts. In another embodiment, the base station can send a page message to the user terminal asking the user terminal to request that a stream be opened. If the user terminal is able to, then in response to the page message, the user terminal sends a RA-rts message to the base station, as discussed before. The advantage of initiating the stream through the user terminal will become clearer as the various messages are described below. Requiring the base station to make all determinations regarding opening streams allows communications system resources to be more efficiently utilized under the central control authority of the base station.

The user terminal or the base station will typically close a stream when it has no more data in its buffer to be sent or shortly thereafter. The request to close the stream is sent in the data traffic channel of the stream as in-band signaling. If, for example, the user terminal is being used as a web browser and a requested web page has been received, then the base station may request that the stream be closed. If another web page is requested through the base station, then the user terminal can open a stream to send the request and to retrieve the next page. If the pages are requested with very little time in between the requests, then the stream may be kept open.

In one embodiment, either the user terminal or the base station can send an alert to the other terminal, which can then be responded to with an immediate shutdown. Any remaining data to be sent will be held for the next opened stream and if no stream is opened, then it will eventually be discarded. In another embodiment, either the user terminal or the base station can send a shut down request to the other terminal asking the other terminal to close the stream. If the other terminal has no further data to transmit, then in response to the shut down request message, it will stop transmitting and the stream will be closed. If the other terminal has data left to transmit, then the requesting terminal may send the shut down request several times before the other terminal's transmit data buffer is exhausted and the stream is closed.

Figure 5:
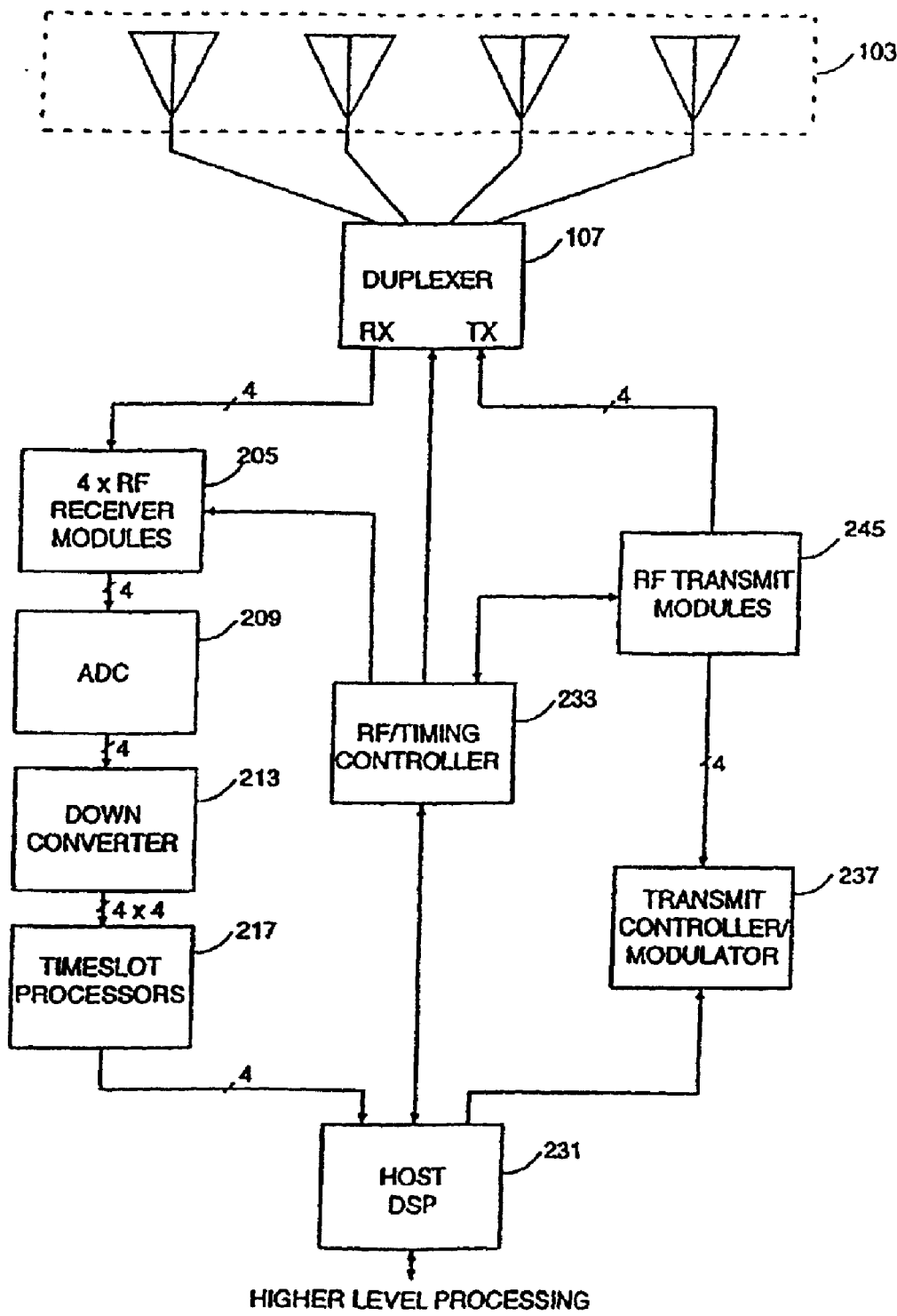
FIG. 5 is a block diagram illustrating an exemplary architecture of a wireless communication system appropriate for use with one embodiment of the present invention.
Figure 6:
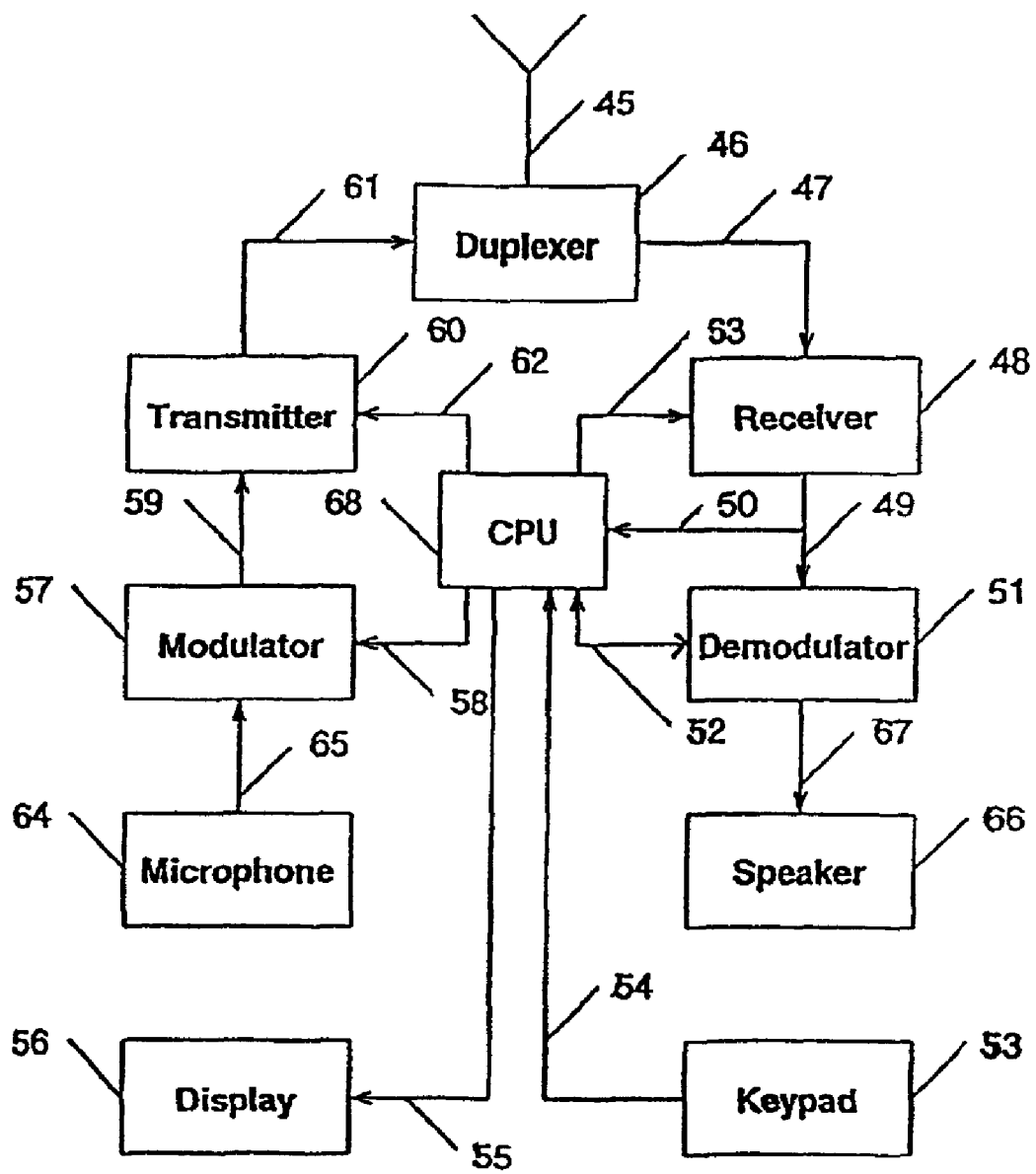
FIG. 6 is a block diagram illustrating an alternate exemplary architecture of a wireless communications system appropriate for use with the present invention.

In one embodiment, the present invention is implemented in a Spatial Division Multiple Access (SDMA) radio data communications system as shown and described further with respect to FIGS. 5 and 6. In such an SDMA system, each terminal is associated with a set of spatial parameters that relate to the radio communications channel between, for example, the base station and a user terminal. The spatial parameters comprise a spatial signature for each terminal. Using the spatial signature and arrayed antennas, data can be sent to several different user terminals at the same time using the same radio frequency and time slot. Conversely, data can be received from several different user terminals at the same time on the same radio frequency and time slot. The spatial signatures allow the otherwise colliding signals to be resolved. The spatial signatures can include such things as the spatial location of the transmitters, the directions-of-arrival (DOAs), times-of-arrival (TOAs) and the distance from the base station. Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Extended Kalman filters or other types of linear filters, well-known in the art, can be used to exploit the properties of the training sequences in determining spatial parameters. Further details regarding the use of SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

Registration

A user terminal forms a relationship with a base station called a registration or session. This registration begins by listening to a BCH (Broadcast Channel) and ends with a handover, timeout, or disconnection. The first step of registration is accomplished by a user terminal by sending a CR (Configuration Request) burst and receiving a CM (Configuration Message) burst. The CM contains basic configuration parameters such as hopping sequence calculation parameters. Using the information from the CM, the user terminal then opens an unauthenticated registration stream using a RA-rreq (Random Access registration request) message. This unauthenticated stream carries only in-band signaling data used to complete registration and assignment of a RID (Registration Identifier) and PID (Paging Identifier). Using the RID, assigned at the end of the registration stream, the user terminal can open subsequent streams and it can end the registration. Using the PID, the user terminal can identify the pages that are directed to it from the base station. A user terminal can have more than one registration with the same or several different base stations. Each registration and session has a unique RID.

During the registration stream, identities and capabilities are exchanged, operating parameters are set, and a RID and PID are assigned. Later, streams may be created and attached to this RID, or the registration state, i.e. RID, PID, and operating parameters, may be replaced by another stream on another base station or another base station modem on the same base station using the same RID or PID. The specific details of registration are provided here as examples only. Many other registration scenarios are also possible within the scope of the present invention.

Figure 1B:
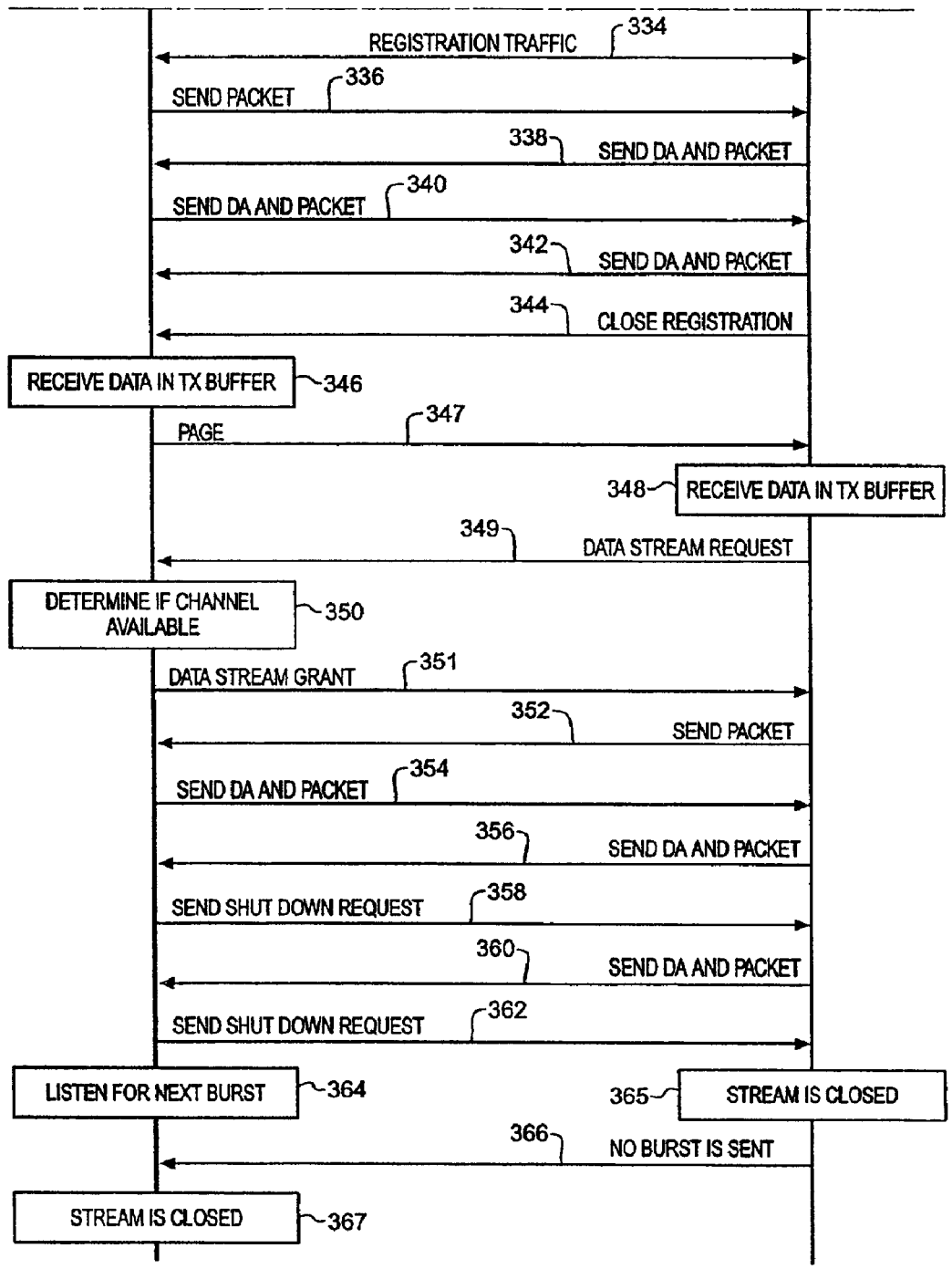

Referring to FIGS. 1A and 1B, the frame timing is established by the base stations that are in the area and transmitting on a pre-programmed RF carrier. The carrier may be a frequency hopping or spread spectrum carrier. However, it is preferred that the carrier be easy to find and be pre-programmed into the user terminals. The base stations, or base station if there is only one, employ GPS or some other precise common timing reference to establish the frame timing 300. GPS timing offers the advantage that it is accurately synchronized and inexpensively available to all base stations. This allows the BCH to be shared by all the base stations with only a minimal guard time in the BCH between base stations. The base stations then build the BCH frame 302 described above and broadcast in their respective assigned slots 304.

When a user terminal turns on, it scans the BCH carrier, a well-known, optionally pre-programmed, RF carrier 306 to find basic frame timing 308 and synchronization 310. The user terminal scans this carrier for BCH bursts, building an RSSI (Received Signal Strength Indicator) map 312. From this BCH RSSI map and other factors, the user terminal selects the strongest or the best base station 314. It also uses the BCH to precisely adjust its oscillator frequency and adjust its frame timing reference 308, 310. This is done using the synchronization and timing sequences in the BCH burst. Then, using its UTID (User Terminal Identification) it builds 316 and sends 320 a CR (Configuration Request), timed relative to the BCH burst for that strongest or best base station. In one embodiment, the CR is scrambled using the BSCC that was received in the BCH from the selected base station 318.

If the intended base station successfully receives the CR and has available capacity, it unscrambles the CR 322, and determines the spatial signature of the user terminal 324. The user terminal receives a CM (Configuration Message) burst in reply 326. The CM contains sufficient information for the user terminal to learn its distance and RF path-loss to the base station, correct its timing advance, adjust its power control, and learn the parameters of frequency hopping (e.g. frame numbering and BSCC (Base Station Color Code) 328. Several base stations may be probed with a CR to find the closest or the best base station. Based on this information from the CM, the user terminal, when it has data to transmit, can start a session, beginning with a RA-rreq (Random Access-registration request) 330. If resources are available, the base station sends an AA-reg-ack (Access Assignment-registration-acknowledgment) 332 to the user terminal assigning a traffic channel for the registration process. The base station and user terminal exchange various access control parameters including encryption keys on this established stream. Finally a RID and PID are assigned. Using this RID, the user terminal can establish secure streams (using e.g. RA-rts/AA-cts as discussed above) in which it transmits and receives data packets 334 until the registration stream is closed 344.

The traffic channel includes a data acknowledgement DA or a data invalid DI response to each transmission. The DA and DI messages are transmitted in the next transmission from the recipient in the next timeslot. In a time division duplex frame, the base station and the user terminal alternate slots 336, 338, 340, 342 or groups of slots, as shown in FIG. 1B. Accordingly, if any slots are not received properly, the data can quickly be retransmitted. This reduces the size of the data buffers at the respective base station and user terminal modems. As shown in Table 1, uplink slots always precede downlink slots and there is a guard time between the two in order to allow for any synchronization errors or unanticipated propagation delays. In one embodiment, each side transmits data packets in three slots, each slot including ramp-up and ramp-down periods as well as synchronization bits as is well-known in the art.

TABLE 1

| 1 | 2 | 3 | | 1 | 2 | 3 | | 1 | 2 | 3 | ... |
|---|---|---|---|---|---|---|---|---|---|---|---|
| Uplink Slots | | | Guard Time | Downlink Slots | | | Guard Time | Uplink Slots | | | |

Periodically, the user terminal scans the BCH to update its RSSI and BSCC map. When it detects a better base station, it may send a CR to this new base station and possibly handover its network session, i.e. its registration. If successful stream initiation fails too many times, the user terminal enters a timeout state. From timeout, it may try to regain a RID via RA-rreq, refresh its timing advance using a CR, find a new base station to which it might handover by scanning the BCH, or even begin from scratch to re-acquire basic frame timing. If this re-establishment is successful, the user terminal may be able to continue its network session by completing a network session handover to the new base station.

Configuration Request CR

An example of a CR (Configuration Request) burst structure is shown in Table 2. CR bursts are distinguished from RA (Random Access) and TCH (Traffic Channel) bursts, in part, by a special CR spatial training sequence. The CR training sequence is longer than normal and has periodic properties that make finding timing alignment especially computationally efficient. The CR burst is shorter than a standard uplink data burst to allow for time-delay with unknown distance between the user terminal and base station.

Table 2 below summarizes the content of the example CR burst. The 82 information symbols are constructed from the configuration request message using modulation and coding.

TABLE 2

| Duration | Contents |
|---|---|
| 10 μsec | ramp-up |
| 260 μsec | training symbols $a_1, a_2, \ldots, a_{130}$ |
| 164 μsec | information symbols $h_1, h_2, \ldots, h_{82}$ |
| 10 μsec | ramp-down |
| 86 μsec | extra guard time |
| 15 μsec | inter-burst guard time |

CR spatial training is the same for all base stations and the base station does not necessarily know the location of the user terminal before receiving the CR. CRs are transmitted by user terminals at a fixed offset from BCH transmissions. CR and CM are scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register. Finally the smart antenna spatial resolution ability of the base station is applied to resolve any remaining ambiguities in received CRs.

A configuration request message is mapped onto a configuration request burst by the physical layer. A configuration message is mapped onto a standard downlink burst by the physical layer. The information symbols of the CR burst are mapped out as shown in Table 3, below. Any of the items listed below can be deleted and transmitted later during the registration cycle or not at all based on the needs of the system.

TABLE 3

| Configuration Request Message | |
|---|---|
| Field | # of Bits |
| identity | 8 |
| utClass | 4 |
| txPwr | 5 |
| Total | 17 |

The meanings of the symbol sets are as follows:

identity: a set of unique random bits for each user terminal that differentiate simultaneous messages from multiple user terminals. Because of the randomness and large number of bits, it is unlikely that two user terminals will select the same identity code at the same time.

utClass: identifies user terminal capabilities (highest modulation class, frequency hopping capabilities, etc.). This sequence identifies the type of user terminal that sent the CR. A palmtop digital assistant might have different capabilities than a desktop computer with a fixed dedicated antenna. With utClass, the different capabilities can be distinguished.

txpwr: the power used by the user terminal to transmit the Configuration Request burst. For example, *user terminal power*=(2 ·txPwr−30) *dBm*.

CR is sent on the control carrier, as an example, exactly 2265 μsec after receipt of a downlink BCH burst. In this way, an otherwise uninitialized user terminal can send CR without any knowledge of the frequency hopping sequence parameters. The CR burst is shorter than a standard uplink time slot to allow for unknown time-of-flight from the user terminal to the base station and typically arrives late in the uplink time slot receive window.

Configuration Message CM

Table 4 below summarizes the content of an example Configuration Message burst. The 460 information symbols are constructed from the configuration message using modulation and coding.

TABLE 4

| Duration | Contents |
|---|---|
| 10 μsec | ramp-up |
| 68 μsec | training symbols $a_1, a_2, \ldots, a_{34}$ |
| 920 μsec | information symbols $h_1, h_2, \ldots, h_{460}$ |
| 68 μsec | training symbols $a_1, a_2, \ldots, a_{34}$ |
| 10 μsec | ramp-down |
| 15 μsec | inter-burst guard time |

The configuration message CM burst is sent on the BCH carrier, after sending a downlink BCH burst, whenever CR was received on the corresponding uplink time slot. CM is also sent in a spatially directed signal based on the analysis of the spatial signature of the received CR burst, for example parameters, such as DOA (direction of arrival) and TOA (time of arrival) of the uplink CR. Since CM is sent on the BCH carrier, a fixed time offset from BCH, an otherwise uninitialized user terminal can receive CM without any knowledge of the frequency hopping sequence parameters. CM, in response to CR, includes, among other things; the AFN (Absolute Frame Number), a larger timing-advance adjustment dynamic range, coarser power control, and various access control parameters. Table 5, below summarizes the content of the CM burst. Any of the items listed below can be deleted and transmitted later during the registration cycle or not at all based on the needs of the system.

TABLE 5

| Configuration Message | |
|---|---|
| Field | # of Bits |
| identity | 8 |
| pwrCtrl | 4 |
| timingAdjust | 7 |
| AFN | 10 |
| carrierMask | 16 |
| racarrierMask | 16 |

TABLE 5-continued

| Configuration Message | |
|---|---|
| Field | # of Bits |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: *offset*=(2·pwrCtrl−16) *dB*.

timingAdjust: timing advance that the user terminal should apply to future random access bursts: timing advance=timingAdjust μs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are nonzero.

raDec: AFNs available for random access channels.

hopping: if equal to 1, the relationship between physical and logical carriers hops each frame.

Random Access-request to send burst

As can be seen from the discussion above, after registration, the user terminal has a RID and a PID and a fair amount of information about the network, including all of the data listed in Table 5. This information includes an assigned random access channel or set of assigned random access channels and an initial transmit power level. This information is used in generating and sending the RA-rts.

Referring again to FIGS. 1A and 1B, after the user terminal has been registered with a particular base station, it can open a stream for a data exchange. The opening of a stream can be initiated by either the base station or the user terminal. Typically a stream will be opened if either the base station or the user terminal has data to send to the other. This data is buffered until a preset amount has accumulated in a transmit buffer or until a preset amount of time has elapsed. The preset amount can be any non-zero value. If the base station has accumulated transmit data in its buffer 346 for the user terminal, then it will send a page, described in more detail below, to the user terminal 347. If the user terminal receives a page or if it has accumulated a sufficient amount of data in its transmit buffer 348, then it will send, for example, an RA-rts message 349. This message, as explained below, is a request that a stream be opened to allow the exchange of data. The base station upon receiving the RA message will analyze its system resource availability 350 and if a suitable channel is available, then it will respond with, for example an AA-cts message 351. This message, as explained below, identifies a channel and assigns it for the stream.

With the RA/AA exchange, the stream is assigned and all the necessary information for the terminals to communicate has been exchanged. With the next uplink slot, the remote terminal will begin sending its data over the assigned channel 352. If the stream was initiated by a page from the base station, then the remote terminal may not have any data to send in which case it will send idle bits. The idle bits help the base station to maintain its spatial parameters for the user when there is no data received. The base station will use these spatial parameters to send its data packets or idle bits 354. In this way, data and acknowledgments are exchanged in the same way as for the registration stream 352, 354, 356.

Table 6 below summarizes the content of an example Random Access Message burst. The burst structure is the same as an uplink data burst on a traffic channel TCH. For an uplink data burst, the information symbols carry data or in-and signaling or both.

TABLE 6

| Duration | Contents |
| --- | --- |
| 10 μsec | ramp-up |
| 146 μsec | training symbols $a_1, a_2, \ldots, a_{73}$ |
| 364 μsec | information symbols $h_1, h_2, \ldots, h_{182}$ |
| 10 μsec | ramp-down |
| 15 μsec | inter-burst guard time |

The RA burst information symbols, in one embodiment, have the fields as shown below in Table 7.

TABLE 7

Random Access Message

| Field | # of Bits |
| --- | --- |
| RAType | 3 |
| ID | 15 |
| UTTxPwr | 5 |
| Total | 23 |

The meanings of the symbol sets are as follows:

RAType: the type of the RA burst as described in association with Table 8.

ID: the registration identifier, either the RID or, for page responses, the PID. This field can be used by the base station to prioritize stream requests. User terminals with a higher priority can be identified by the RID or PID and be granted a stream in preference to other users. The ID is also used to access the registration account and information of the requesting user terminal.

UTTxPwr: the power used by the user terminal to transmit the burst.

Any one or more of these fields may be deleted or modified and more fields may be added to suit particular applications.

The RAType field allows for there to be different types of RA messages sent to the same channel. Table 8 lists possible examples that can be supported with a three bit field. Further or different types of RA messages can be used depending upon the particular nature of the network. More bits can be used to allow for still more different types of messages. As an alternative, the user terminal may send a different RA burst depending on the circumstances as listed in Table 8. All of the RA bursts in Table 8 are sent on the random access channel assigned to the user terminal by the base station. In one embodiment, the RA channels are a set of channels that are also used for traffic.

TABLE 8

| Value | Symbol | Meaning |
| --- | --- | --- |
| 000 | RA-rts | stream request |
| 001 | RA-ping | keep-alive poll request |
| 010 | RA-rts-short | short stream request |
| 011 | RA-rts-directed | directed stream request |
| 100 | RA-page response | stream request due to page |
| 101 | RA-rts-UM | stream request, unacknowledged mode |
| 110 | RA-rreq | registration request |

The meanings of the symbol sets are as follows:

RA-rts will be discussed further below and is the mechanism with which the user terminal can open a new communications stream following registration.

RA-ping: can be used to alert the base station to the location, channel characteristics and activity of a user terminal without opening a stream. Pinging the base station can be used to keep a registration alive.

RA-rts short, -directed and -UM: can be used to open special types of streams.

RA-page response: can be sent when the user terminal has no data to transmit but is requesting that a stream be opened in response to a page from the base station. In some systems, it may be preferred that the base station open the stream directly without first paging the user terminal as discussed above.

RA-rreq: can be used to open a new registration or change an existing registration.

As mentioned above, a user terminal uses the RA bursts after registration, however, it may be useful in network management for a single user terminal to have two registrations for different individuals, different accounts, different types of communications or other reasons.

Access Assignment Burst

The user terminal transmits any random access message such as RA-rts on the uplink side of the random access channel. The base station uses the downlink portion of the random access channel to grant random access requests and to assign resources to the requested data stream using an AA (Access Assignment) message. The AA message can have different formats. One format is shown in Table 9 below.

TABLE 9

Access Assignment Message

| Field | # of Bits |
| --- | --- |
| ID | 15 |
| AAType | 3 |
| modClassUp | 5 |
| modClassDown | 5 |
| frameDec | 3 |
| resource ibChan | 6 |
| pwrCtrl | 4 |
| timingAdjust | 5 |
| tOffset spChan | 3 |
| Total | 49 |

The meanings of the symbol sets are as follows:

ID: the id of the user terminal, either the RID or PID that was transmitted in the RA-rts.

modClassUp: identifies the modulation and coding used for the uplink.

mopClassDown: identifies the modulation and coding used for the downlink.

frameDec: defines fractional rate channels.

resource ibChan: indicates the uplink/downlink resource pair that is assigned to the stream.

pwrCtrl: a power adjustment for the UT to apply to subsequent transmissions.

timingAdjust: a timing adjustment for the UT to apply to subsequent transmissions.

tOffset: training sequence offset adjustment for the UT to apply to subsequent transmissions.

AAType: indicates the type of Access Assignment message. Many different possible types are possible. Table 10 below provides one example set of AA types.

TABLE 10

| Value | Symbol | Meaning |
|---|---|---|
| 000 | AA-cts | stream grant |
| 001 | AA-reject | request rejected |
| 010 | AA-ping-ack | keep-alive poll acknowledgment |
| 011 | AA-cts-short | short uplink grant |
| 100 | AA-cancel | cancel previous false page |
| 101 | AA-prev-short-ack | previous short uplink was successful |
| 110 | AA-invalid-ack | received RA is not valid |
| 111 | AA-req-ack | registration grant |

The meanings of the symbol sets are as follows:

AA-cts: (Access Assignment-clear-to-send) begins a stream with the sending user terminal based on the parameters in the AA-cts message. An AA-cts can be sent in response to any of the RA messages and is particularly appropriate for RA-rts, RA-ping, RA-rts-directed, RA-page-response, and RA-rreq. This allows the base station to open a stream even if the user terminal was not aware of the need to open a stream. The next communication will be data in the opened stream. As mentioned above, data will be transferred until the corresponding stream data buffers are emptied. Typically the stream is then closed. However, the stream may be closed upon the occurrence of many other events as well.

AA-reject: can be used to reject and direct the UT to start a timer before sending an RA message. Such a response can relieve congestion on a busy base station. The UT in response may elect to wait or to send an RA-rts to another base station that has better traffic availability.

AA-ping-ack: acknowledges the RA-ping and resets the timers for the registration. The pinging process can be used to prevent a registration from expiring for lack of traffic. Maintaining the registration allows a stream to be opened immediately with e.g. an RA-rts and an AA-cts. If the registration expires then that registration process must be repeated before a data stream can be opened.

AA-cts-short, and AA-prev-short-ack: can be used for special types of streams.

AA-cancel: can be used to respond to an RA-page-response when no page was sent or the paging condition no longer applies.

AA-invalid-id: can be used to notify the UT that it is using a RID or PID that has expired or is not valid with the responding base station. The UT can use the information in the AA to request that a new registration stream be opened by sending e.g. RA-rreq.

AA-reg-ack: is the acknowledgement of RA-rreq that begins a registration stream.

As mentioned above, the base station can send a page to the UT directing the UT to send an RA-page-response message to the base station. In one embodiment, this reduces the control traffic overhead by using a paging channel. The paging channel can be efficiently utilized by the base station and the page can allow random access channel assignments that increase the channel efficiency of establishing the desired data stream. The page bursts are transmitted on a paging channel which may be used exclusively for pages or it may be shared with other functions such as a broadcast channel or a control channel. Alternatively a section of a traffic channel can be used for pages. Pages will contain an indication of the base station sending the page and of the user terminal being paged, typically the PID. If the UT is already registered then the page does not need to also include any information about how to respond to the page because this information can be included in the registration data exchange stream. In the embodiment discussed above, the UT will respond to a page in the random access channel by sending a RA-page-response message, however other types of responses are also possible.

In-Band Signaling

Within the data stream, any uplink or downlink burst can contain tagged data fields. The tagged fields can have user data and in-band signaling data. The in-band signaling can be used for layer 2 (data link layer) and layer 3 (network layer) messages, including a request to shut down the stream, a request to open another stream, a request to change the type of the stream, or a request to update registration information. The in-band signaling can also be used for other things such as modulation and transmission channel data reports.

Stream Closing Handshake

Typically, when both sides have exhausted their transmit buffers the stream will be closed 358. Either the base station or the remote terminal can close the stream. The base station can close the stream for resource management reasons, even if the transmit buffers have not been exhausted.

In one embodiment, either the base station or the user terminal can close the stream by sending any of the following in-band messages:

alert: this message requests an immediate closing of the stream. The message can be replied to with no response. When the requesting terminal receives no data on the next traffic channel slot, it can assume that the alert was received by the other station. Such a protocol minimizes the time and overhead required to close the stream.

no new packets: this message requests that the receiving terminal stop adding packets to its transmission buffers. After the currently buffered packets are transmitted, the stream will be shut down. If, later on, further new packets arrive to be sent, then a new stream can be opened. Such a command can allow e.g. a base station to reallocate channels in order to optimize loading from different users.

shut down request: this message signals a request to close the stream. If the receiving terminal has no data to transmit, then it may close the stream by sending no more bursts. If it still has data to transmit, then it may continue to transmit until its buffers are emptied. The shut-down request may be repeated several times by the requesting terminal before the stream is closed.

The process for a shut down request is illustrated in more detail in FIGS. 1A and 1B. In the example of FIGS. 1A and 1B, the base station has made a determination to close the stream, however, the remote terminal may also make the decision in which case the same process would apply but with the roles of the two terminals reversed. The base station sends a shut-down request to the user terminal 358. The user terminal receives the request, however, in the example of FIGS. 1A and 1B, it still has data to send, so instead of closing the stream it sends a data burst with an acknowledge of the last packet from the base station 360. The base station may continue to send shut-down requests 358 which are answered by data bursts 360 for as long as the user terminal desires to send data. If the base station or the user terminal requires a faster closing of the stream, then it can send an alert or a no new packets request at any time. If the shut-down request is used, then the terminal that receives the request will continue to send data bursts until its transmit buffer is depleted and it has no more data to send.

The base station continues to send the shut-down requests 362 and after the user terminal's transmit buffer is depleted, it closes the stream on its side and stops transmitting 365. The base station continues to listen to the listen to the traffic channel for the stream 364 and when no burst is received 366, it assumes that the user terminal has closed the stream and closed the stream at its end 367. The base station does not send an express acknowledgement and the user terminal does not wait for an acknowledgement before it closes the stream. Accordingly, the user terminal is ready to open a new stream or handover to another base station as soon as it sends its last data burst. The base station is ready to reallocate that channel to a different stream as soon as it receives no data burst from the user terminal. The channel is than available immediately to be assigned to a different, or the same user for a new stream. As a result of not sending an acknowledgement, in addition to freeing the channel resource sooner, the potential cross-channel interference that might be caused by an acknowledgement signal is also avoided.

In a lossy channel, the base station can wait through one more frame, listening for the user terminal's data burst. If two frames go by with no data burst from the user terminal, then the terminal can close the stream. This accounts for the possibility that the user terminal's signal was lost in the channel and was not received by the base station even though the user terminal made a transmission. In such a case, the base station can respond to the reception of no data burst with a data invalid message together with the shut-down request. When the base station again receives no data burst from the user terminal, it will close the stream.

Stream Closing Decision

Figure 2:
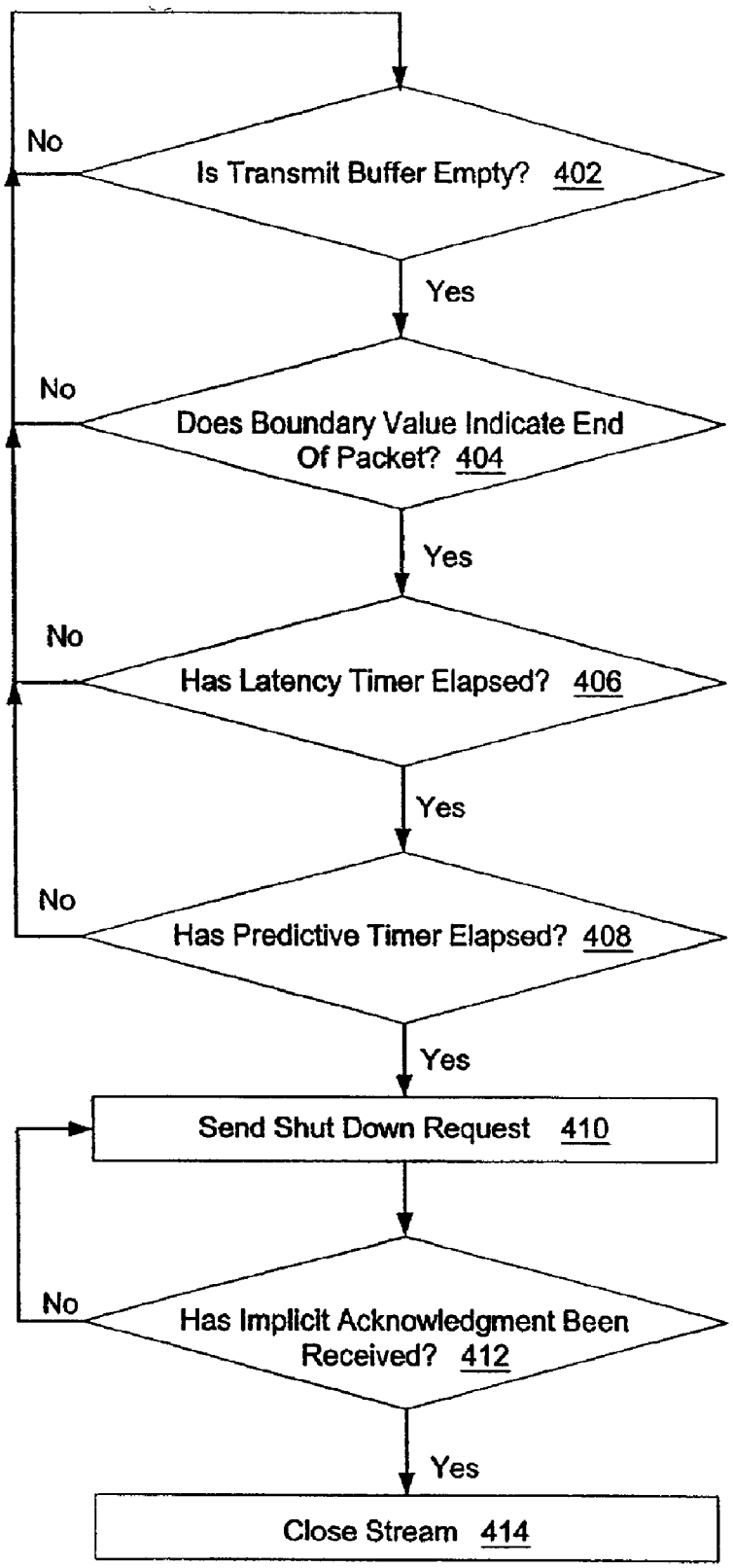
FIG. 2 is a flow diagram showing a decision process for closing a stream in accordance with the present invention.

FIG. 2 shows a flow chart for making a decision to close a stream. Each of the features of the decision tree can be used independently of each other or all together, as illustrated here. In addition, as mentioned above, the base station and the user terminal can both close a stream, so either terminal can implement the decision process discussed below. Typically every terminal includes a stream resource manager module that checks buffers, looks for flags and maintains registers as is required to implement the functions described. As mentioned above, a decision to close a stream is normally started when the transmit buffer begins to be emptied 402. The stream resource manager can monitor the transmit buffer and use the bit transfer rate to predict in advance when the buffer will be emptied. This allows sufficient time to handle the other steps shown in FIG. 2.

If the transmit buffer is empty or about to be emptied, the stream resource manager can refer to boundary value flags that are included in the data or received separately from higher layers 404. The boundary values help to delimit packets and can be used not only for stream closing decisions but also on the receive end to reassemble received packets. Typically, packet size will not match data burst size, especially in a system with variable modulation schemes. In that case, the bit rate of the data stream can vary during the stream or at least in each new stream. Accordingly, the boundary values can be used to reassemble data packets that are transmitted during several different bursts. The boundary values can be in the form of a header for each packet that includes delimiting values among other things or as flag bytes between packets. The boundary values can be restructured for transmission by a higher layer.

Alternatively, the stream resource manager, rather than analyzing the data in the transmit buffer, can receive packet delimiting information from higher layers. By determining packet limits the stream resource manager can analyze the transmit buffer content and determine whether the entire packet has been received in the buffer. If the entire packet has been received in the buffer, then the stream can be closed. If a portion of the packet is yet to be received, then the stream should be kept open to send that portion of the packet that is yet to come. In addition to simple delimiting packet boundaries, that data or the higher layers can also identify the type of data traffic. Streaming video, for example, will require that a data stream be kept open until the video stream is stopped or has ended. Voice telephony may allow the stream to be closed during silent periods on one terminal or the other. Internet browsing may have rather long periods during which no data is transmitted so streams can be closed more aggressively.

The stream resource manager will typically have a latency timer which must elapse before a stream is closed. The latency timer can be set by a system or resource administrator or assigned to a terminal by a base station. The latency timer prevents a stream from being closed too quickly. If the timer has not elapsed, i.e. if the transmit buffer has not been empty long enough, then the stream will not be closed 406. A minimum value for the timer is the time required to close a stream and then open a new stream. If the stream is closed before this much time elapses, then, if new data arrives immediately after the stream is closed, a new stream must immediately be opened and the stream opening and closing process does not result in increasing the availability of channels for other users. In addition, it increases latency for the user that closed the stream because it cannot send the data until the new stream is opened. The latency timer might also include an additional increment of time in order to reduce traffic on the random access channel that is used to open streams. It may also include an additional increment of time to account for known latency in other parts of the system. For example, if the data feeding into the buffer was subject to random delays, the length of these delays can be added so that such a delay is not interpreted as the end of the data stream. Further aspects of the latency timer are discussed below.

After the latency timer has timed out, the stream resource manager refers to a predictive time 408. This timer may be referred to before or as an alternative to the latency timer. If the predictive timer has not timed out, then the stream will not be closed. The stream resource manager establishes the predictive timer by looking at the history of receiving data in the transmit buffer. This history includes identifying packet delimiters. The history will show what the typical gaps are between packets and what the typical delays are between packets. The delays may be part of the communications channels being used but it may also be caused by the habits of the terminal user. The stream resource manager can look at all of these trends and establish a predictive timer value that optimizes efficiency based on the patterns of the particular user.

If the predictive timer has also timed out, then the terminal sends a shut-down request 410 as discussed above. It then listens to the return link. If it receives an implicit acknowledgement of its shut-down request 412, i.e. if the other terminal stops transmitting, then it closes the stream 414.

As can be understood from the discussion above, the present invention allows a circuit-switched communications channel to be opened with a single handshake by using a previous virtual circuit to set up constant routing information. The channel is the stream opened by sending a RA-rts message or an in-band rts message. The virtual circuit is the result of registration. All the routing information that does not depend on the physical channel assigned for the stream is done one time up front for all channels As a result, the handshake for opening a new stream that will allocate a physical channel can be minimized to a single channel request (RA-request to send) and a single channel grant (AA-clear to send). As can be seen from the discussion above, both of these messages are short, reducing their impact on the random access channel. In addition, the two-message protocol minimizes the time needed to open physical channels.

As described above, the present invention also minimizes the overhead in closing a stream. This allows the channel to be reused by other users as quickly as possible. It also allows the stream closing strategy to be more aggressive in choosing when to close streams. As described above, in one embodiment, when one side of the air interface is ready to close a stream, it will send a message to its peer requesting that that the stream be shut down. If the peer is also ready to close the stream, than the peer will shut down its side of the stream immediately. The original side will sense that the peer is no longer using the channel, and will take this as an implicit acknowledgement of the shut down request. Thus, there is a single-pass handshake, and furthermore, that response part of the handshake is implicit. Making the response implicit allows the peer side to avoid using one last frame to send an explicit acknowledgement message.

The fast stream request and grant exchange allows that system to aggressively open and close channels when there is no data to send or receive. This allows a channel that would otherwise be allocated but idle to be available as soon as possible to another user that will actually use it. When one side of an air-interface channel has no data to send and also receives no data for a configurable number of frames, it will attempt to de-allocate that channel. This configurable number of frames constitutes a timer and can be set to a small value, including a single frame, so the channel will be de-allocated as soon as there is no data to send and receive.

Stream Aggregation

As mentioned above, the present invention allows more or fewer streams to be assigned to a user terminal based on the traffic demand for that user terminal. The user terminal can keep the base station informed of its traffic needs using in-band signaling in the traffic channel or its open stream, in particular, the queue depth report. The base station can combine this information with its knowledge of user terminal channel characteristics, bit rate, modulation type, SINR and other factors including its reserve traffic capacity to determine whether another stream should be opened. Alternatively, the user terminal can autonomously decide that it desires more bandwidth and request another stream directly. This can be done using any of the methods discussed above, including an rts message with in-band signaling, an RA-rts, or an RA-rreq that opens another registration on another resource, where a further stream can be opened. The base station receiving these messages is aware of the user terminal's identity whether it is using the same registration ID (RID) or not and determines whether any request to open a stream will be granted.

For stream aggregation, the following in-band signaling messages are important:

aggregate: This message requests the user terminal to open a stream on a designated resource. The user terminal will respond by transmitting bursts on the resource that is designated in the aggregate signal. This message can designate a hardware resource with which the user terminal is not registered, in which case the user terminal will respond by sending a RA-rreq to the designated resource. After registration as described above, the user terminal will send an RA-rts to attempt to open a stream on the designated resource.

queuedepthrep: This message reports the number of bytes waiting for transmission in the respective terminal's packet queue. In one embodiment, this is an uplink message that the user terminal uses to report to the base station when the queue depth has grown too large. The report helps the base station to know when a user terminal requires more bandwidth and accordingly, when to send an aggregate message. It also helps the base station know when the current stream can be de-allocated. If the queue depth is low and decreasing, then, using the transmission data rate, the base station can predict when the queue will be emptied. In one embodiment, the queue depth report includes two bytes. The first byte indicates how many packets are waiting in the user terminal's uplink ring buffer. The second byte indicates how many packets are waiting in the user terminal's layer 3 (network layer) packet queues.

sinr: This message reports the signal quality in terms of signal to interference ratio although any other measure may be used. In the present embodiment, this is only a message that a user terminal sends to the base station since the base station can measure its own SINR. This sinr message can be used to adjust signal parameters including adjusting the type of modulation and the redundancy to be applied in coding the bursts that it sends to the user terminal. The base station can also use the sinr message to adjust its transmit power level.

Operation

Figure 3:
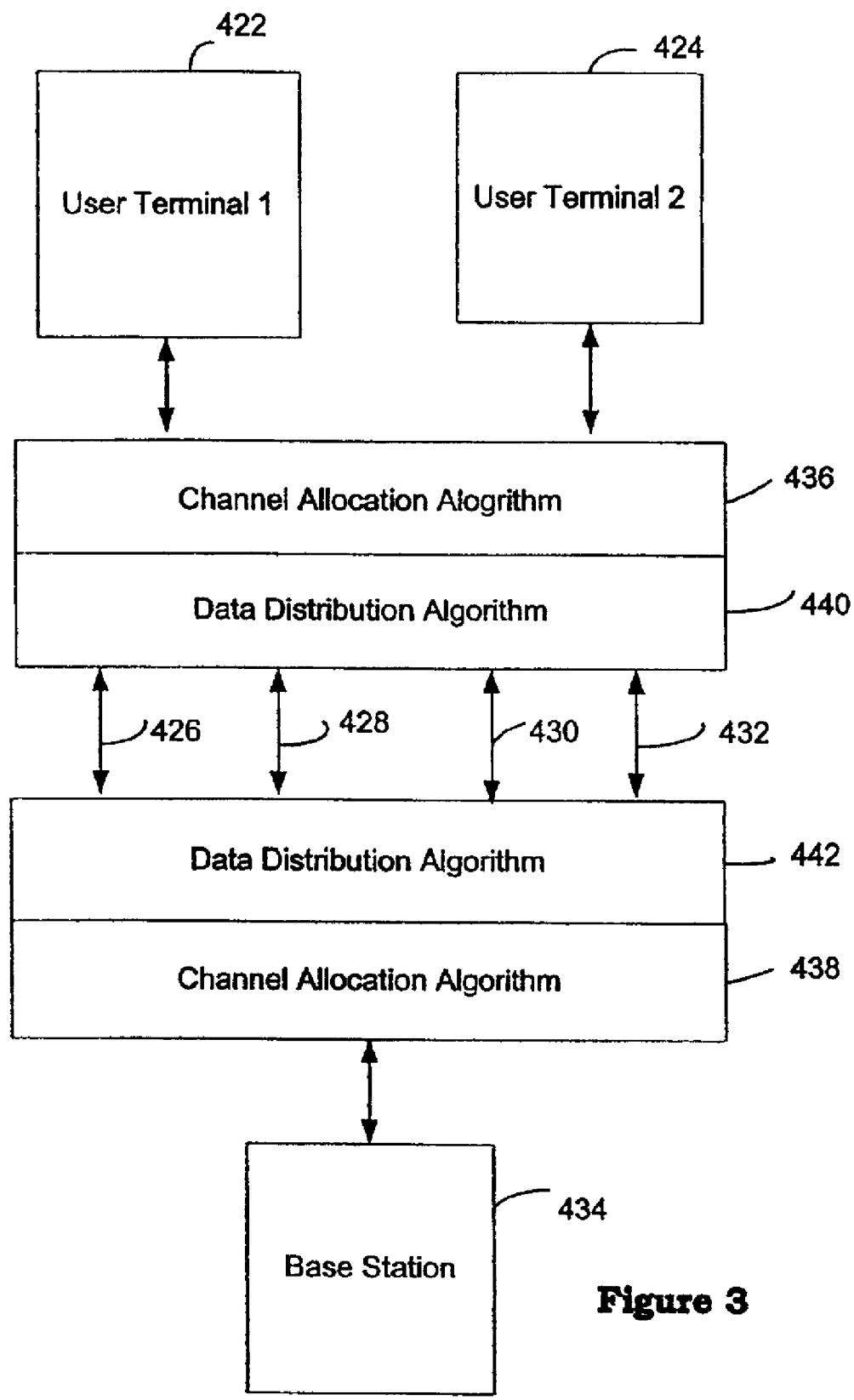
FIG. 3 is a diagram showing a dynamic allocation and de-allocation mechanism in accordance with the present invention.

As shown in FIG. 3, stream aggregation is particularly well-suited to systems in which several user terminals 422, 424 communicate using several shared communications channels 426, 428, 430, 432 with a base station 434 or other radio terminal. At both the user terminals and the base station there is a channel allocation algorithm 436, 438 to assign the shared communications channels to the respective users. There is also a data distribution algorithm 440, 442 to allocate data into the shared channels and to retrieve it from the shared channels to be reassembled into its original form.

The operation of the stream aggregation can be illustrated with an example. Assume that a user terminal is registered with a base station and that it has opened a stream using, for example, the RA-rts/AA-cts process discussed above. If this one stream is not enough bandwidth to satisfy the user terminal's needs then it is a likely candidate for stream aggregation. Additional streams can be opened and aggregated with the current stream either on the user terminal's initiative or on the base station's initiative.

The user terminal will typically open another stream using in-band signaling by transmitting a request-to-send request to the base station in the traffic channel of the current stream. Using in-band signaling enhances the efficiency of the overall network. The user terminal can also add a stream using a random access channel and sending an RA-rts message to the same or a different hardware resource. The RA-rts message can even be sent to another base station if the other base station is also within range and the user terminal is registered with that base station. If the user terminal is not registered with that base station then it can register as discussed in detail above.

The base station upon receiving either the in-band rts or the RA-rts will analyze available resources and either reply with a stream assignment using AA-cts, for example, or not respond to the request. If the user terminal does not receive a response to the request it can try again later when perhaps more resources will become available. As discussed above, there are many other possible AA responses to the RA-rts. Any of these responses can be used by the base station whether sent in-band or on the channel for AA messages. After the user terminal receives a stream assignment, it will begin transmitting on the assigned channel, thereby aggregating the second stream with the first to increase the bandwidth available to it.

The user terminal can request more streams up to the limit of its ability to transmit on multiple channels and the limit of the base station's willingness to grant additional channels to a single user. As discussed below, the user terminal can request additional streams based on predicted need or a backup of data to transmit. Similarly the user terminal can close any streams that it no longer needs in the manner discussed above. Accordingly, the user terminal's bandwidth can be varied as its needs vary.

As mentioned above, the base station can also initiate the aggregation of streams. This is typically done by sending an aggregate command using in-band signaling. However, the base station can also send a page requesting that the user terminal send a RA-rts. The aggregate command consumes traffic channel bandwidth in the stream but is faster. The page has the benefit of freeing the existing stream while delaying the opening of the new stream for a frame or two while the user terminal generates the RA-rts, waits for AA-cts etc. The aggregate command will identify the channel for the new stream as will the AA-cts so that both approaches can result in a new stream being opened for the user terminal. The base station, in either event controls the channels that are used for the original and then for the new streams.

Aggregation can be enhanced for simpler user terminals if the base station assigns the new streams to additional time slots of the channel that the user terminal is already using. Aggregating the streams on a single carrier simplifies transmission and reception for both the base station and the user terminal. If no further time slots are available on the current channel, the base station can open the new stream on another channel, close the original stream and open a second stream on another time slot of a second channel. Using the stream close and open processes discussed above, traffic and channel assignments can be managed in many different ways to suit the particular requirements of different networks.

Channel Allocation Algorithm

As mentioned above, in the present invention a set of streams are dynamically allocated and de-allocated among all users in the system. Because this allocation is dynamic, the system can compensate for varying traffic patterns from a given user. Additional streams are allocated to a user when its traffic increases, and streams are de-allocated when its traffic decreases. The channel allocation algorithm incorporates a dynamic criterion for detecting when to add and when to remove channels for a particular user.

In one embodiment, the channel allocation algorithm is based on the current queue depths for users and channels. When data is received from a user, it is placed in a queue that is mapped to that particular user. A new stream is allocated to a given user if the current user's channel queue depth (as measured in bytes, bits, packets, or other units) is above pre-specified threshold values. If the queue channel depth falls below the threshold, the channel allocation algorithm simply closes a stream. The thresholds can be spaced apart appropriately in order to provide some hysteresis as is well known in control theory. In addition, if a second stream is added and, after a selected time, the channel queue depth is still too great, then a third, fourth, and further channels can be added. Appropriate thresholds are provided for each new stream.

The channel allocation algorithm can be operated by the user terminal looking at its own queue depths and by the base station looking at its queue depths. In addition, since the present invention provided for a queue depth report to be sent on an uplink from the user terminal to the base station, the base station can decide to open another stream by looking at the user terminal's queue depth. By driving the channel allocation algorithm from the base station, other factors unavailable to the user terminal can also be considered. A primary factor is other user demands and available capacity. Allocation decisions can be further optimized by looking at the rate at which data is received from the user terminal, the bit rate of the assigned stream or streams and the queue depth report. By taking all three factors into consideration, the base station can scale the queue depth at the user terminal to the data transmission rate. Higher bandwidth channels can accommodate a greater backlog of data to transmit without adding additional latency to the traffic channel.

Finally, the channel allocation algorithm can compile a short-term history of queue depth. If the rate data coming into the user terminal varies, then the queue depth at any particular instant may not accurately reflect the bandwidth needs of the user terminal over a longer period of time. Immediately after a large chunk of data is received, the queue may be very deep. If there is a relatively long delay before the next chunk is received, then the queue may be very shallow. Averaging the queue depth over time can even out the inconsistencies. By averaging several queue depth reports or if the user terminal averages several queue depth measurements before making a report, the base station can make a better determination of actual bandwidth needs.

While, the dynamic criterion for aggregating streams is described here as based on queue depths, other factors may be used in addition or instead. Streams can be aggregated when a high bandwidth task such as streaming media, diagnostics or two-way audio is performed. Streams may also be allocated based on messages from higher layers such as the application layer or the session layer.

Data Distribution Algorithm

The data distribution algorithm handles both incoming and outgoing data. For data sent by a particular user to the network, this algorithm splits the data onto the set of streams currently allocated to that user. For each user, the data distribution algorithm takes data from transmit packet queues, splits the data across the allocated streams, and puts the data in queues associated with each individual stream. For data received from the network's streams, it reassembles a particular user's data from the user's set of streams and sends it to the user. The data distribution algorithm is designed to minimize data latency for each user. However, it can be optimized for other factors besides latency minimization. For instance, it could be written to improve in-order packet reception, or to minimize per-user channel allocation.

In one embodiment, the data distribution algorithm relies on the data delimiter tags in the packet queue which delimit packet boundaries. The algorithm alternates between streams placing a complete packet in the transmit queue of stream with the emptiest transmit queue. Alternatively, the algorithm alternates between streams placing a complete packet in the transmit queue of each stream one after the other. This allows packet integrity to be retained. When the packets are reassembled at the receiver, each packet can then be ordered with other received packets based on the information in the reconstructed packet.

In an alternative embodiment, the data in the packet queue is distributed based on the amount of data that can be transmitted in each burst of the respective stream. If, for example, each traffic channel burst carries 494 bits, then the data distribution algorithm divides the packets into chunks of 494 bits including identification headers that link the chunk to its packets and its position in the packet. The 494-bit chunks are then placed successively in the respective queues of each stream. The chunks can be placed alternately in each queue or a small number of chunks can be placed in one stream queue and then the next small number of chunks can be placed in the next queue and so on cycling through all of the open streams.

Figure 4A:
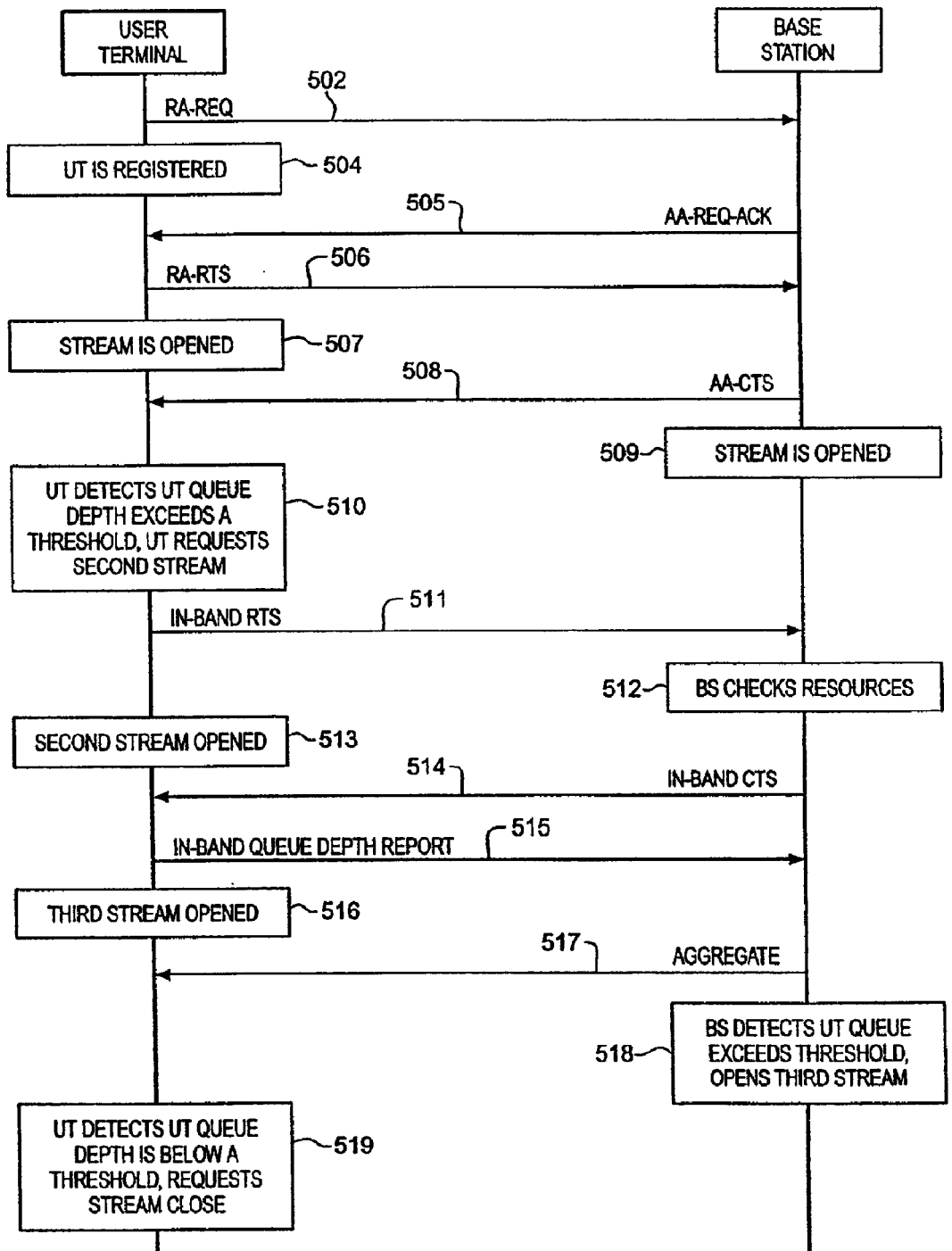
FIGS. 4A and 4B are a diagram showing an exemplary exchange of messages for dynamically allocating and de-allocating communication streams in accordance with the present invention.
Figure 4B:
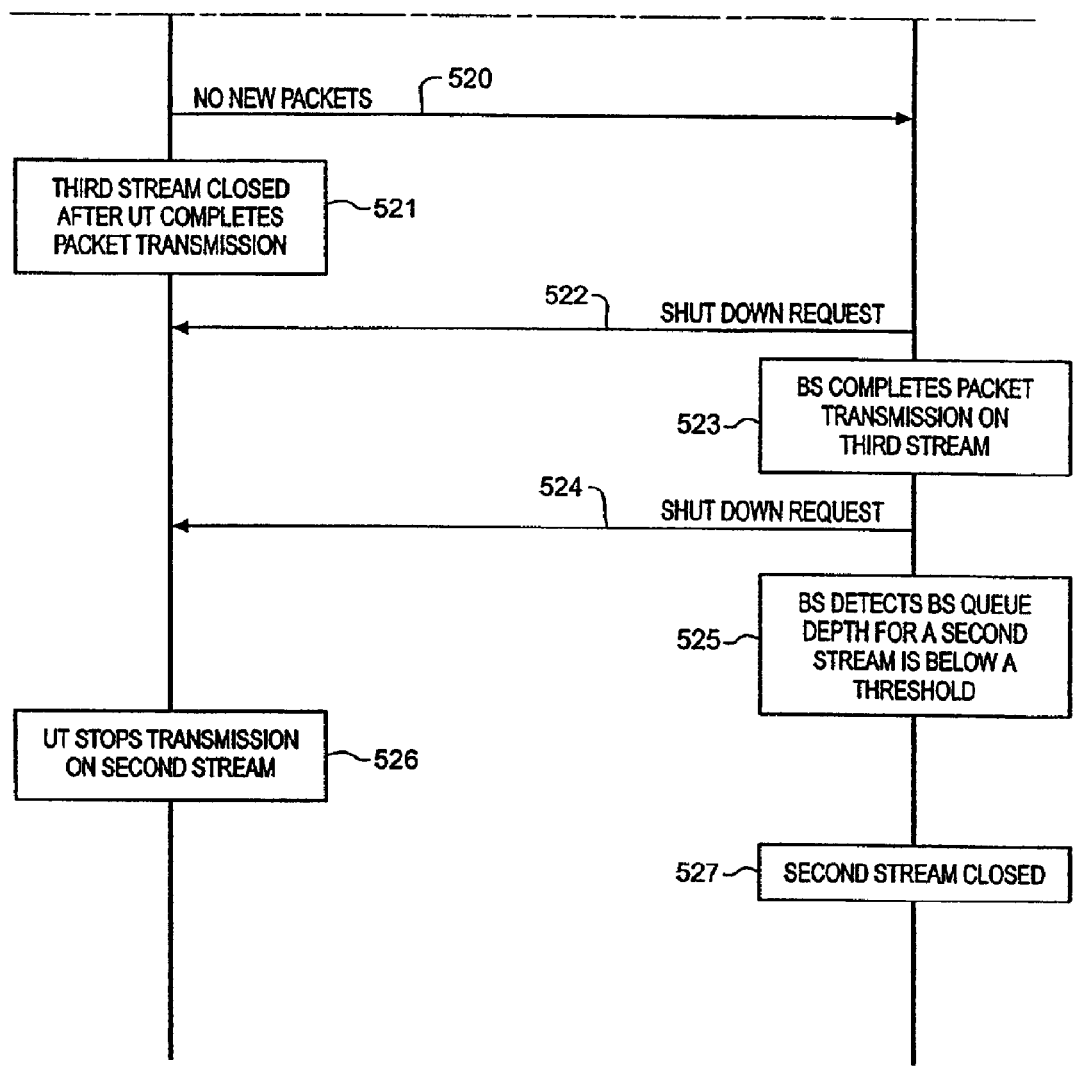

An example process flow is set forth in FIGS. 4A and 4B. In FIGS. 4A and 4B, the user terminal and the base station complete a registration cycle using and a RID and a PID are assigned 502, 504, 505. Accordingly, a stream can be opened 506, 507, 508, 509 as discussed above. During the stream in-band signaling is used to report SINR, queue depth, transmit power, modulation class and other characteristics of the terminals and the channels. The user terminal (UT) and the base station (BS) continue to monitor queue depth and assess whether the current stream is adequate. In the event that the UT determines that its queue depth has become too great 510, it can request that another stream be opened 511. As discussed above, this determination can be made by comparing that queue depth to a threshold or in several more complicated ways. The base station receives the request and if a stream is available 512 can grant the request 514, thereby opening another stream 513.

The user terminal, in the meantime continues to report queue depth to the base station 515. The BS can, on that basis, decide that system resources are best utilized by opening another stream 518 and sends an in-band aggregate command 517. This opens a third stream 516. The base station may open the third stream because it wishes to empty this user's queue before making another allocation or because it has extra resources that allow it to provide more bandwidth than at peak times. The thresholds discussed above can accordingly be made flexible in light of the current traffic demands on any one base station. As mentioned above further streams may be opened using a variety of different protocols including pages and random access requests to different base stations.

At some time, in the example of FIGS 4A and 4B, the bandwidth demands of the user terminal diminish. The user terminal detects that its own queue depth is below a threshold 519 and sends a no new packets signal 520 to the base station. After the base station has sent all of the packets that it had in its queue for the third stream 523, it sends a shut down request to the user terminal 522. This closes the stream. If the user terminal still has data to transmit, then it continues to transmit until its buffers for the third stream are emptied 521. The second stream is closed based on a queue depth report after the base station determines that the queue depth is below a particular threshold 525. It then sends a shut down request to the user terminal for the second stream 524. The user terminal can respond to this request by stopping transmission on the second stream thereby closing it 526.

The scenario described with respect to FIGS. 4A and 4B has been selected to illustrate one example of how streams can be aggregated to dynamically change the allocation of bandwidth in a multiple user system. There are many other possible scenarios and many possible messages that can be sent to open or close a stream. In addition either the user terminal or the base station can respond to the queue depth of the user terminal. The user terminal can respond to the base station only if the base station's queue is reported to the base station. However, the user terminal can respond to its own higher layer processing that might predict that the base station will have a large number of packets to send. This could happen, for example, if higher layer processing was downloading a large file through the base station. The user terminal can then acquire more bandwidth to accommodate the task, even though most of the traffic will be queued in the base station's buffers.

Base Station Structure

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 5 shows an example of a base station of a wireless communication system or network suitable for implementing the present invention. The system or network includes a number of subscriber stations, also referred to as remote terminals or user terminals, such as that shown in FIG. 6. The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency to an FM intermediate frequency ("IF"). This signal then is digitized (sampled) by analog to digital converters ("ADCs") 209. Final down-converting to baseband is carried out digitally. The down-converting can be done using finite impulse response (FIR) filtering techniques. This is shown as block 213. The invention can be adapted to suit a wide variety of RF and IF carrier frequencies and bands.

There are, in the present example, four down-converted outputs from each antenna's digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56311 DSPs can be used as timeslot processors, one per receive timeslot. The timeslot processors 217 monitor the received signal power and estimate the frequency offset and time alignment. They also determine smart antenna weights for each antenna element. These are used in the spatial division multiple access scheme to determine a signal from a particular remote user and to demodulate the determined signal.

The output of the timeslot processors 217 is demodulated burst data for each of the four received timeslots. This data is sent to the host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights for each user terminal to the host DSP 231. The host DSP 231 maintains state and timing information, receives uplink burst data from the timeslot processors 217, and programs the timeslot processors 217. In addition it decrypts, descrambles, checks error detecting code, and deconstructs bursts of the uplink signals, then formats the uplink signals to be sent for higher level processing in other parts of the base station. With respect to the other parts of the base station it formats service data and traffic data for further higher processing in the base station, receives downlink messages and traffic data form the other parts of the base station, processes the downlink bursts and formats and sends the downlink bursts to a transmit controller/modulator, shown as 237. The host DSP also manages programming of other components of the base station including the transmit controller/modulator 237 and the RF timing controller shown as 233.

The RF timing controller 233 interfaces with the RF system, shown as block 245 and also produces a number of timing signals that are used by both the RF system and the modem. The RF controller 233 reads and transmits power monitoring and control values, controls the duplexer 107 and receives timing parameters and other settings for each burst from the host DSP 231.

The transmit controller/modulator 237, receives transmit data from the host DSP 231, four symbols at a time. The transmit controller uses this data to produce analog IF outputs which are sent to the RD transmitter (TX) modules 245. Specifically, the received data bits are converted into a complex modulated signal, up-converted to an IF frequency, 4-times over-sampled, multiplied by transmit weights obtained from host DSP 231, and converted via digital to analog converters ("DACs") which are part of transmit controller/modulator 237 to analog transmit waveforms. The analog waveforms are sent to the transmit modules 245. The transmit modules 245 up-convert the signal to the transmission frequency and amplify the signals. The amplified transmission signal outputs are sent to antennas 103 via the duplexer/time switch 107.

User Terminal Structure

FIG. 6 depicts an example component arrangement in a user terminal that provides data or voice communication. The user terminal's antenna 45 is connected to a duplexer 46 to permit antenna 45 to be used for both transmission and reception. The antenna can be omni-directional or directional. For optimal performance, the antenna can be made up of multiple elements and employ spatial processing as discussed above for the base station. In an alternative embodiment, separate receive and transmit antennas are used eliminating the need for the duplexer 46. In another alternate embodiment, where time division duplexing is used, a transmit/receive (TR) switch can be used instead of a duplexer as is well-known in the art. The duplexer output 47 serves as input to a receiver 48. The receiver 48 produces a down-converted signal 49 which is the input to a demodulator 51. A demodulated received sound or voice signal 67 is input to a speaker 66.

The user terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a user terminal central processing unit 68 (CPU) as is received data before demodulation 50. The user terminal CPU 68 can be implemented with a standard DSP (digital signal processor) device such as a Motorola series 56300 DSP. This DSP can also perform the functions of the demodulator 51 and the modulator 57. The user terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications user terminal. In another embodiment, the microphone and speaker are also in direct communication with the CPU to provide voice or data communications.

The user terminal's voice signal to be transmitted 65 from the microphone 64 is input to a modulator 57. Traffic and control data to be transmitted 58 is supplied by the user terminal's CPU 68. Control data 58 is transmitted to base stations during registration, session initiation and termination as well as during the session or stream.

In an alternative embodiment, the speaker 66, and the microphone 64 are replaced or augmented by digital interfaces well-known in the art that allow data to be transmitted to and from an external data processing device (for example, a computer). In one embodiment, the user terminal's CPU is coupled to a standard digital interface such as a PCMCIA interface to an external computer and the display, keyboard, microphone and speaker are a part of the external computer. The user terminal's CPU 68 communicates with these components through the digital interface and the external computer's controller. For data only communications, the microphone and speaker can be deleted. For voice only communications, the keyboard and display can be deleted.

In the description above, for the purposes of explanation, numerous specific details are set forth in order to provide a through understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 5 and 6, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data is exchanged. Such systems include voice, video, music, broadcast and other types of data systems without external connections. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method for allocating multiple communications streams of a circuit switched time division multiple access wireless communications system comprising:

identifying a first terminal and a second terminal to each other for the communication of traffic in slots of the time division multiple access wireless communications system over at least one of multiple streams, the at least one stream comprising an assigned sequence of time slots on assigned frequencies; and dynamically allocating and de-allocating further streams comprised of further time slots on assigned frequencies based on the traffic to be carried and the traffic capacity of opened streams between the first and the second terminals.

2. The method of claim 1, further comprising opening a stream for communications between the first terminal and the second terminal before dynamically allocating and de-allocating.

3. The method of claim 1, wherein dynamically allocating and de-allocating comprises comparing traffic to be carried between the first terminal and the second terminal to the capacity of any open streams between the first terminal and the second terminal and allocating or de-allocating at least one stream based on the comparison.

4. The method of claim 1, wherein dynamically allocating and de-allocating comprises comparing depths of transmit queues to the capacity of any open streams between the first terminal and the second terminal and allocating or de-allocating at least one stream based on the comparison.

5. The method of claim 1, wherein dynamically allocating and de-allocating comprises receiving messages from higher layers regarding traffic demands and comparing the traffic demands to the capacity of any open streams between the first terminal and the second terminal and allocating or de-allocating at least one stream based on the comparison.

6. The method of claim 1, further comprising distributing upstream packets between all allocated streams for transmission to the second terminal and recombining transmitted data received from the second terminal into packets at the first terminal.

7. The method of claim 1, wherein identifying a first terminal and a second terminal to each other comprises registering a first terminal and a second terminal with each other for opening and closing multiple streams.

8. A machine-readable medium having stored thereon data representing sequences of instructions which, when executed by a machine, cause the machine to perform operations comprising:

identifying a first terminal and a second terminal to each other for the communication of traffic in slots of a circuit switched time division multiple access wireless communications system over at least one of multiple streams, the at least one stream comprising an assigned sequence of time slots on assigned frequencies; and dynamically allocating and de-allocating further streams comprised of further time slots on assigned frequencies based on the traffic to be carried and the traffic capacity of opened streams between the first and the second terminals.

9. The medium of claim 8, further comprising instructions which, when executed by the machine, cause the machine to perform further operations comprising opening a stream for communications between the first terminal and the second terminal before dynamically allocating and de-allocating.

10. The medium of claim 8, wherein the instructions for dynamically allocating and de-allocating further comprise instructions which, when executed by the machine, cause the machine to perform further operations comprising comparing traffic to be carried between the first terminal and the second terminal to the capacity of any open streams between the first terminal and the second terminal and allocating or de-allocating at least one stream based on the comparison.

11. The method of claim 8, wherein dynamically allocating and de-allocating comprises comparing depths of transmit queues to the capacity of any open streams between the first terminal and the second terminal and allocating or de-allocating at least one stream based on the comparison.

12. A first terminal of a circuit switched time division multiple access wireless communications system comprising:

a registration algorithm to identify the first terminal and a second terminal to each other for the communication of traffic in slots of the time division multiple access wireless communications system over at least one of multiple communication streams of the communications system, the at least one stream comprising an assigned sequence of time slots on assigned frequencies;

a channel allocation algorithm to dynamically allocate and de-allocate further streams comprised of further time slots on assigned frequencies based on the traffic to be carried and the traffic capacity of opened streams between the first and the second terminals; and a data distribution algorithm to distribute upstream packets between all allocated streams for transmission to the second terminal and recombining transmitted data received from the second terminal into packets at the first terminal.

13. The apparatus of claim 12, wherein the channel allocation algorithm compares traffic to be carried between the first terminal and the second terminal to the capacity of any open streams between the first terminal and the second terminal and allocates or de-allocates at least one stream based on the comparison.

14. The apparatus of claim 12, wherein the channel allocation algorithm compares depths of transmit queues to the capacity of any open streams between the first terminal and the second terminal and allocates or de-allocates at least one stream based on the comparison.

15. The apparatus of claim 12, wherein the channel allocation algorithm receives messages from higher layers regarding traffic demands and compares the traffic demands to the capacity of any open streams between the first terminal and the second terminal and allocates or de-allocates at least one stream based on the comparison.

16. A method for allocating multiple communication streams of a circuit switched time division multiple access wireless communications system comprising:
- comparing traffic to be carried between a first terminal and a second terminal in slots of the time division multiple access wireless communications system to the capacity of the multiple streams, the streams comprising an assigned sequence of time slots on assigned frequencies;
- allocating at least one stream based on the comparison for communications between the first terminal and the second terminal based on the comparison;
- further comparing traffic to be carried between the first and the second terminal after allocating the at least one stream; and
- allocating or de-allocating at least one further stream comprised of further time slots on assigned frequencies based on the further comparison.

17. The method of claim 16, wherein allocating or de-allocating at least one stream comprises allocating at least one further stream.

18. The method of claim 16, wherein allocating or de-allocating at least one stream comprises de-allocating at least one allocated stream.

19. The method of claim 16, further comprising allocating a stream for communication of traffic between the first terminal and the second terminal before comparing traffic to be carried.

20. The method of claim 16, wherein comparing comprises looking at the depth of a transmit queue of at least one of the first and second terminals.

21. The method of claim 16, wherein comparing comprises looking at the depth of a transmit queue of at least one of the first and second terminals and predicting the amount of traffic to be carried based on the queue depth.

22. The method of claim 16, wherein comparing comprises looking at the depth of a transmit queue of at least one of the first and second terminals and comparing the queue depth to a threshold queue depth.

23. The method of claim 16, wherein comparing comprises receiving a transmit queue depth report at the first terminal from the second terminal and comparing the queue depth to the traffic capacity of open streams between the first terminal and the second terminal.

24. The method of claim 16, wherein looking at the depth of a transmit queue comprises taking an average of the queue depth at different times and looking at the average queue depth.

25. The method of claim 16, further comprising dynamically allocating and de-allocating streams based on the traffic to be carried and the traffic capacity of opened streams between the first and the second terminals.

26. A method for allocating multiple communications streams of a circuit switched time division multiple access wireless communications system comprising:
- opening a first wireless communications stream between a first terminal and a second terminal for the communication of traffic, the first stream comprising an assigned sequence of time slots on assigned frequencies;
- transmitting a transmit queue depth report from the first terminal to the second terminal;
- receiving an assignment of a further stream comprised of further time slots on assigned frequencies for communications between the first and the second terminal based on the queue depth report;
- transmitting further queue depth reports from the first terminal to the second terminal; and
- receiving further stream allocations and de-allocations based on the further queue depth reports.

27. The method of claim 26, wherein the queue depth report comprises an average of the depth of a transmit queue of the first terminal at different times.

28. The method of claim 26, further comprising registering the first terminal and the second terminal with each other for the communication of traffic over at least one of multiple streams before opening a first stream.

* * * * *